June 21, 1932. H. D. STEVENS 1,864,155
METHOD AND APPARATUS FOR REENFORCING TIRE BEADS
Original Filed June 11, 1926 5 Sheets-Sheet 1

INVENTOR
Horace D. Stevens,
BY
ATTORNEYS.

June 21, 1932. H. D. STEVENS 1,864,155
METHOD AND APPARATUS FOR REENFORCING TIRE BEADS
Original Filed June 11, 1926 5 Sheets-Sheet 3

INVENTOR
Horace D. Stevens.
By Ely + Barrow
ATTORNEYS.

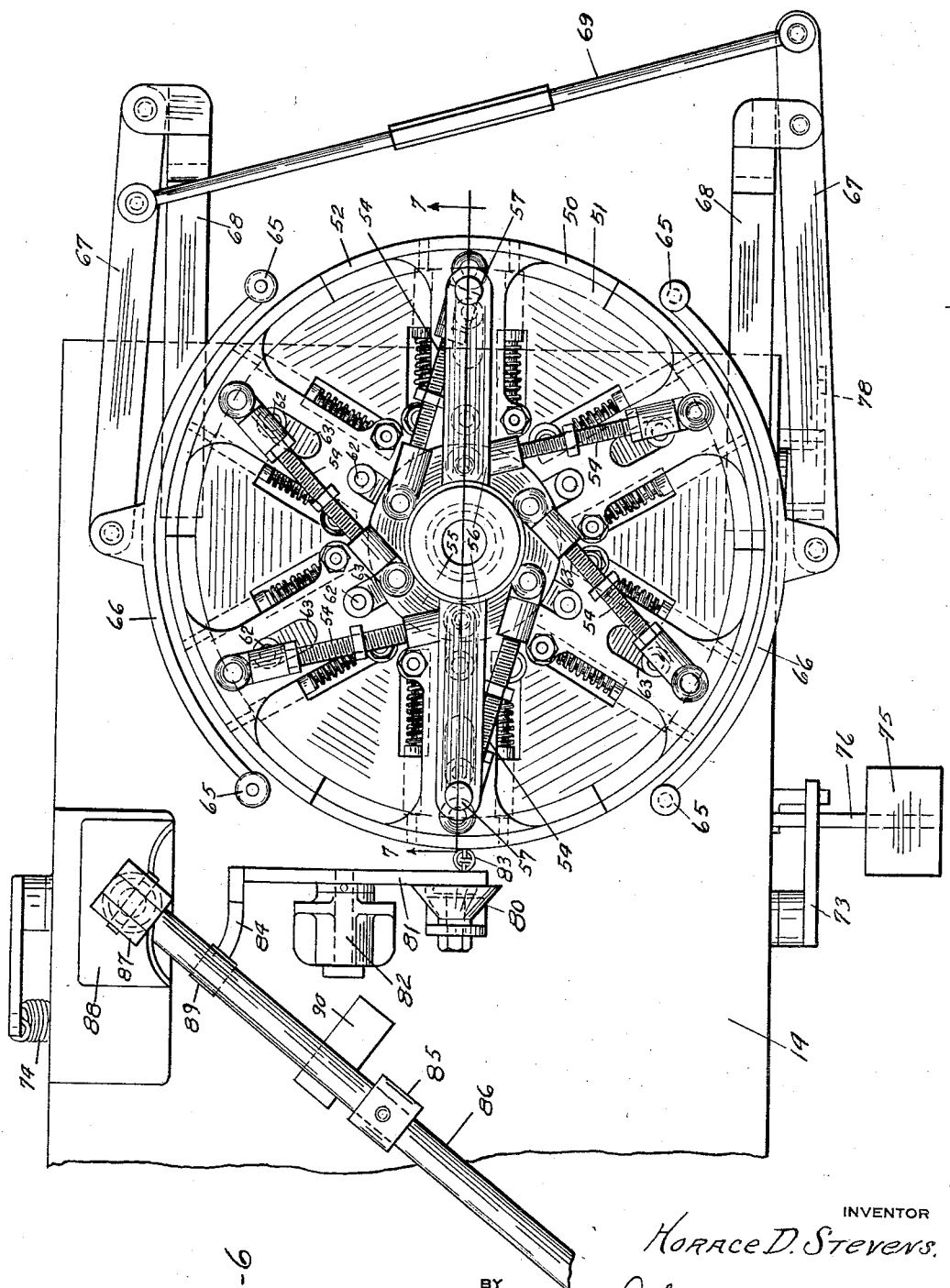

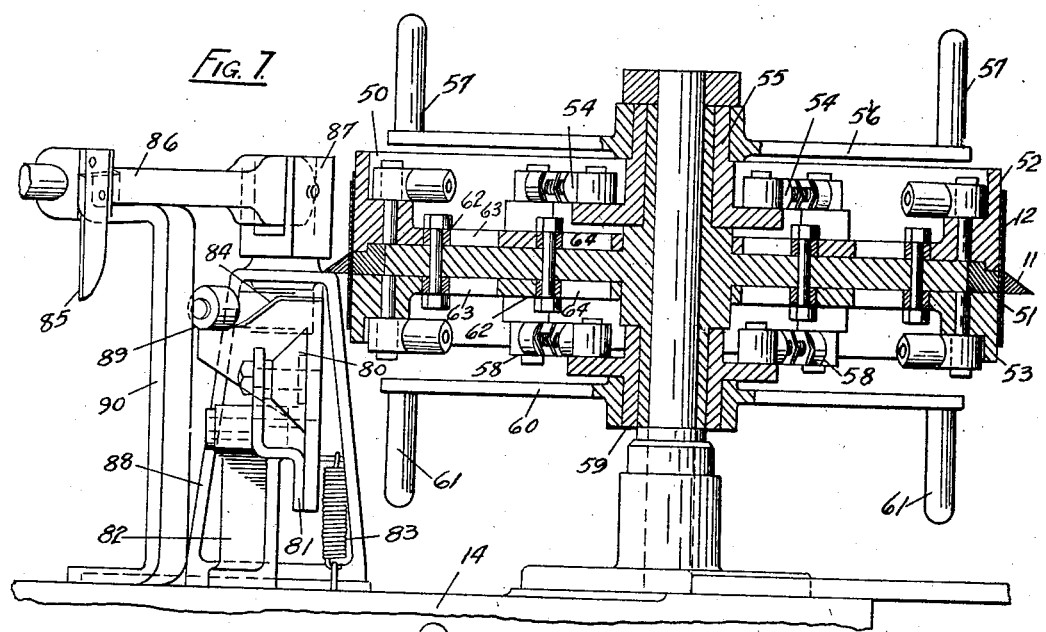
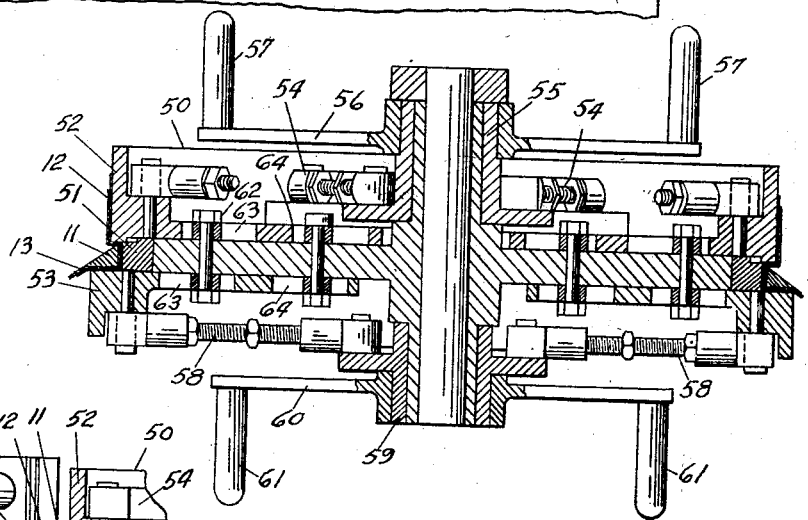
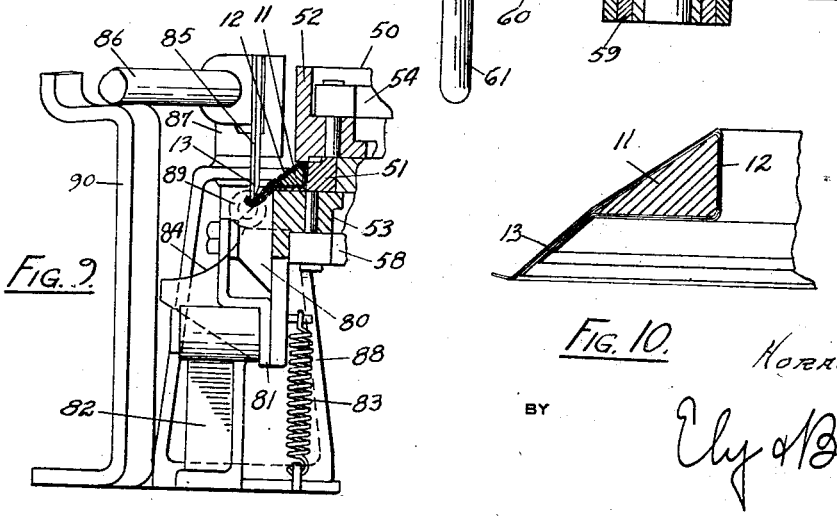

Patented June 21, 1932

1,864,155

UNITED STATES PATENT OFFICE

HORACE D. STEVENS, OF AKRON, OHIO, ASSIGNOR TO THE FIRESTONE TIRE & RUBBER COMPANY, OF AKRON, OHIO, A CORPORATION OF OHIO

METHOD AND APPARATUS FOR REENFORCING TIRE BEADS

Original application filed June 11, 1926, Serial No. 115,249. Patent No. 1,787,411, dated December 30, 1930. Divided and this application filed March 31, 1930. Serial No. 440,386.

This invention relates to procedure and apparatus for reenforcing beads, and particularly those of the larger sizes, frequently called giant beads, for straight side pneumatic tires of rubber and fabric.

Heretofore, beads of the larger sizes have been reenforced by hand. Many attempts have been made to provide a method whereby suitable apparatus may be employed effectively to construct such beads and to provide apparatus to carry out such method, but methods and apparatus heretofore employed have not been sufficiently successful to compete with the hand method either in expense or in quality of workmanship.

The general purpose of the present invention is to provide a practicable method and apparatus for effectively carrying out said method, whereby giant beads are well and inexpensively reenforced.

The foregoing and other objects are obtained by the method and devices illustrated in the accompanying drawings and described below. It is to be understood that the invention is not limited to the specific embodiment thereof disclosed herein.

This application is a division of my Patent 1,787,411 granted December 30, 1930.

Of the accompanying drawings,

Figure 6 is a plan of the reenforcing strip folding and flipping mechanism; and

Figure 7 is a part section on line 7—7 of Figure 6;

Figure 8 is a repetition of part of the preceding view illustrating the strip folding instrumentalities in operation about a bead;

Figure 9 is a repetition of another portion of Figure 7 illustrating the flipper forming mechanism in operation on the bead; and Figure 10 is a section through a completed reenforced bead ready for placement onto a tire carcass.

Figure 1:
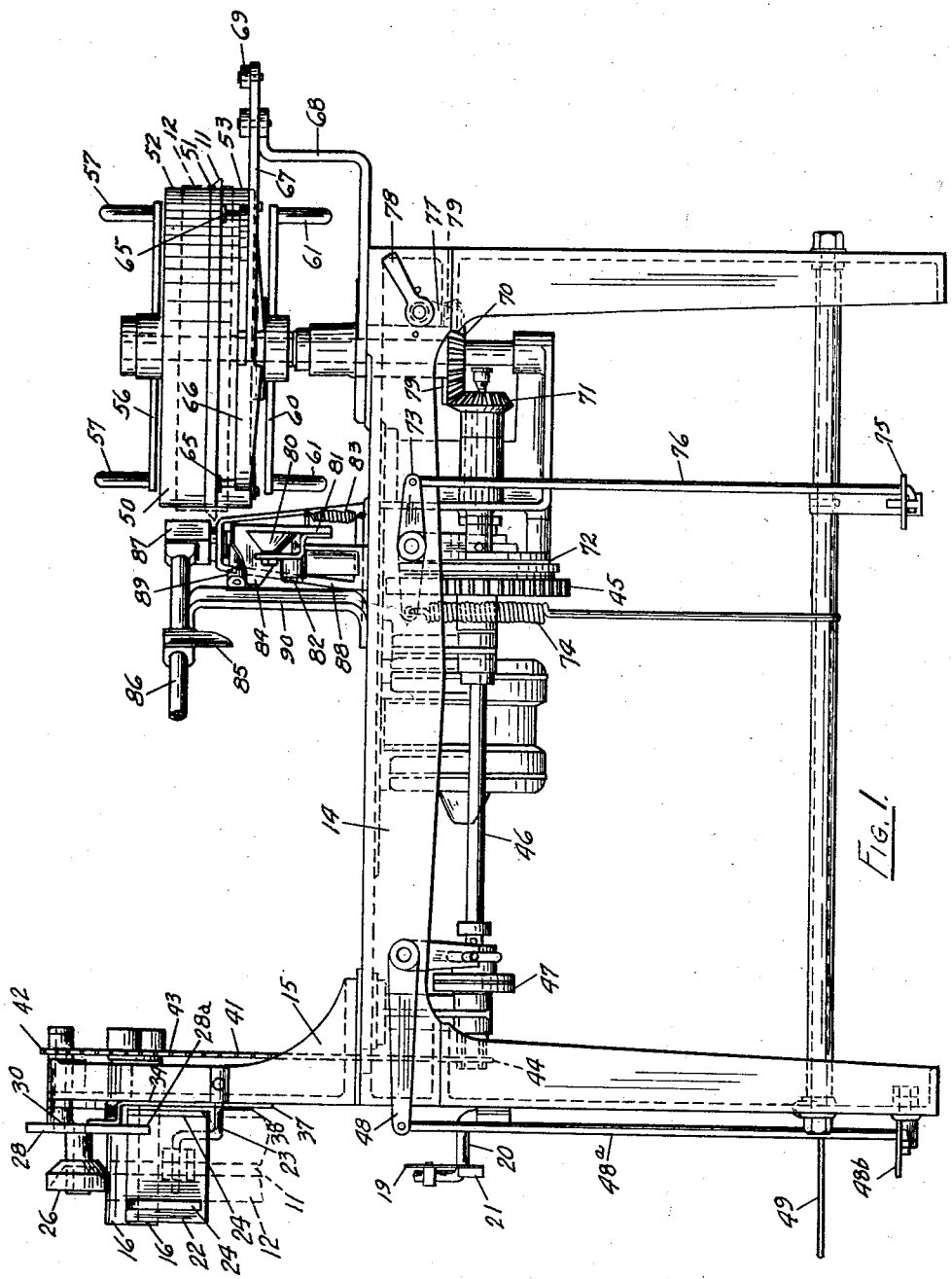
Figure 1 is a front elevation of bead reenforcing apparatus constructed in accordance with and adapted to carry out the invention.

Referring to the drawings, the numeral 11 (Figure 10) illustrates an endless, inextensible, straight side bead constructed in a known manner and reenforced by a composite band 12 folded about the bead and formed with a flipper portion 13 which anchors the bead in the carcass of the tire. The present apparatus and procedure are designed to manufacture such beads, and especially those of the larger sizes for tires such as truck and bus tires.

Figure 2:
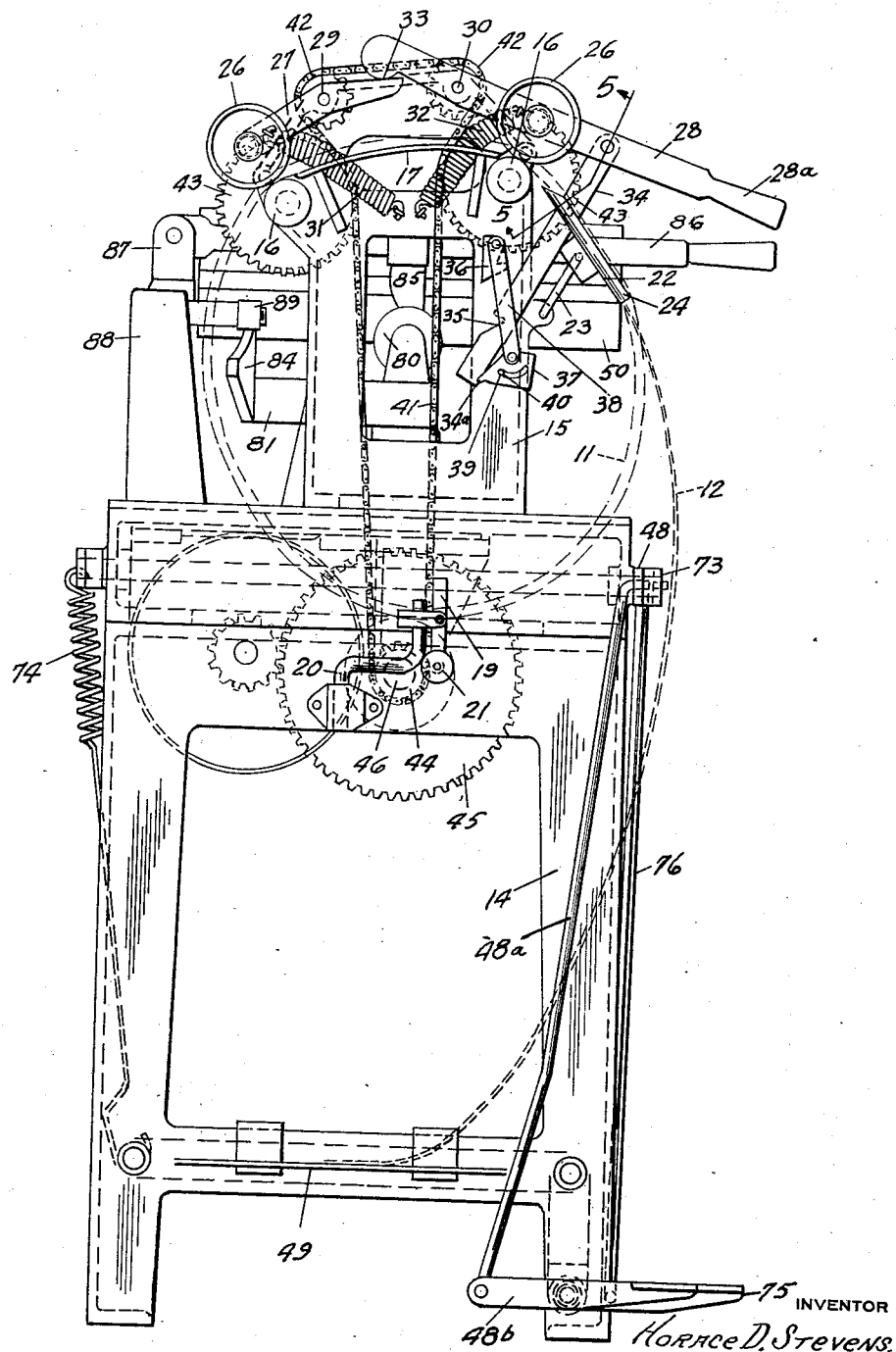
Figure 2 is a left end elevation thereof.
Figure 3:
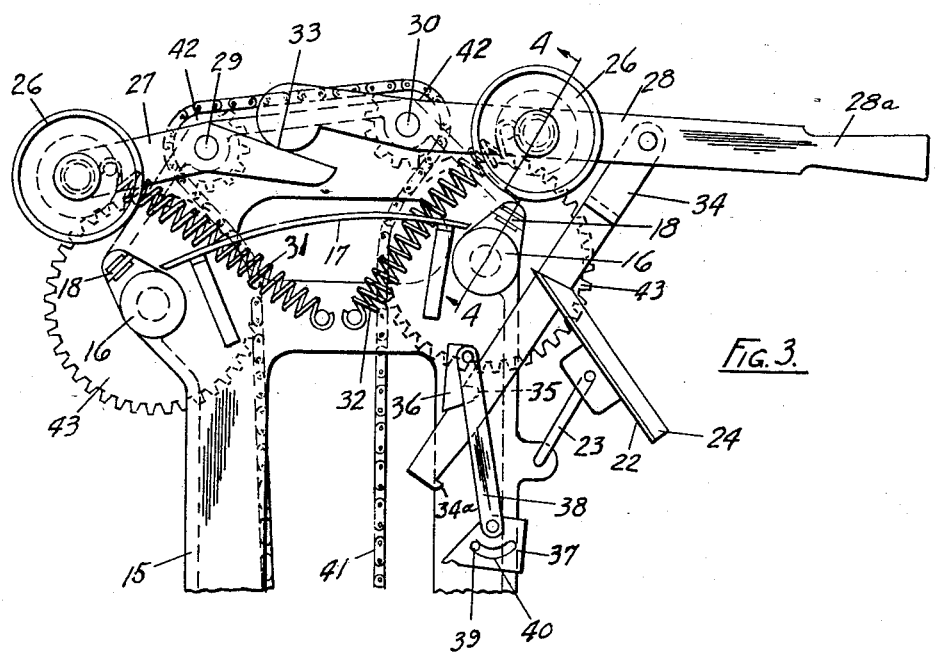
Figure 3 is a detail left end elevation illustrating the reenforcing strip applying mechanism.
Figure 4:
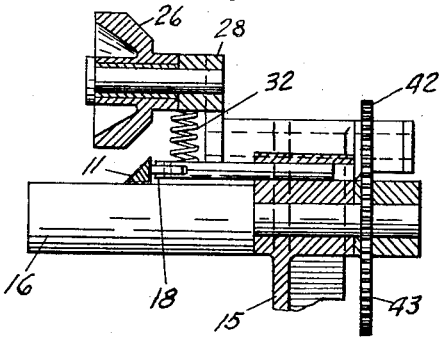
Figure 4 is a section on line 4—4 of Figure 3.
Figure 5:
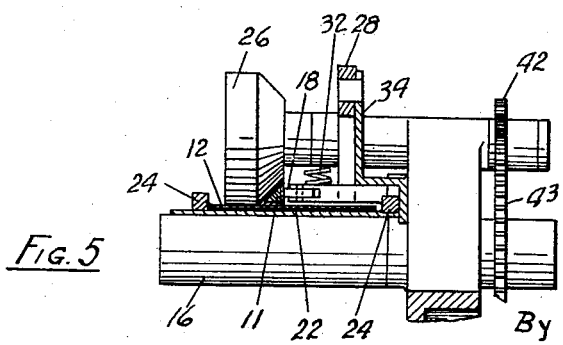
Figure 5 is a section on line 5—5 of Figure 2.

The method consists in forming the annular bead of substantially right triangular shape in section; in forming a stepped composite reenforcing strip; in applying the reenforcing strip about the inner periphery thereof to provide a transversely flat band secured to the inner periphery of the bead as illustrated in Figures 1 to 5; in next folding the strip outwardly about the "heel" and "toe" of the bead, as illustrated in Figures 7 and 8; and finally in flipping one side of the strip downwardly over the hypotenuse of the bead onto the other side of the strip to provide the flipper for anchoring the bead in the tire.

*Strip applying mechanism*

This apparatus may be mounted on a table 14, a bracket 15 being mounted on one end thereof, in which are journaled transversely flat, bead supporting and driving rollers 16, 16 bridged by a curved support 17 on which the bead rides. For aligning the bead accurately in the machine, rollers 18, 18 arranged above rollers 16 are provided to engage the inner side of the bead when placed on rollers 16, and a guide 19 is freely pivoted on a bracket 20 on table 14 and is normally urged upwardly by a weight 21 thereon so as to engage the inner side of the lower portion of the bead to prevent wabbling of the bead on rollers 16, and consequent improper application of the reenforcing strip.

An upwardly directed, strip guiding plate 22 is provided for directing the reenforcing strip into proper position against the inner periphery of the bead, plate 22 being supported on a bracket 23 secured on bracket 15 and having guide bars 24, 24 secured on its upper surface to engage the edges of the strip 12.

For pressing the strip 12 and bead 11 together, rollers 26, 26 are arranged to operate against the hypotenuse of bead 11 to press the bead 11 and strip 12 against rollers 16. Rollers 26 are mounted on levers 27 and 28, pivoted respectively at 29 and 30 on bracket 15, and having springs 31 and 32 respectively connected thereto, and to bracket 15 for normally urging rollers 26 against rollers 16. Lever 28 is provided with a handle 28$^a$ and levers 27 and 28 have cooperating cam surfaces at 33, whereby upward movement of lever 28 will elevate rollers 26 from rollers 16 to facilitate placing work in the machine. Suitable mechanism for releasably latching the lever 28 in its upper position may be provided in the form of a latch bar 34 provided with a notch 35 into which a latch 36, pivoted on bracket 15, is adapted to engage. Latch bar 34 is automatically operable into engagement with latch 36 by upward movement of lever 28 since bar 34 has a hook 34$^a$ on its lower end arranged to engage a dog 37 pivoted on a link 38 suspended from the pivot of latch 36, dog 37 being guided by a pin 39 on bracket 15 engaged in an arcuate slot 40 in said dog, whereby dog 37 will swing bar 34 upon upward movement of lever 28 into engagement with latch 36 so that the latter will fall into notch 35.

Driving of rollers 16 may be accomplished by means of a chain 41 trained over sprockets 42, 42 journaled on the top of bracket 15 and meshed with sprockets 43, 43 secured on rollers 16. Chain 41 may be driven by a sprocket 44 arranged to be driven by a gear 45 journaled on a shaft 46 and adapted to be clutched thereto by a clutch 47 operable by a bell crank lever 48 pivoted on table 14 and connected by a rod 48$^a$ to a pedal 48$^b$.

Arranged beneath the strip applying mechanism adjacent the bottom of table 14 is a shelf 49 for supporting the end of the covering strip to prevent its engagement with the floor.

*The strip folding and flipping mechanism*

This mechanism includes a rotary drum 50 preferably arranged to rotate in a horizontal plane on table 14 and provided with a central fixed portion 51 and radially expansible sectional portions 52 and 53, the central portion 51 being adapted to engage the inner periphery of the bead and the portions 52 and 53 to fold the strip 12 respectively about the toe and heel of the bead (Figure 8). Sections 52 are operable outwardly by toggle links 54, 54 connected to a central rotatable member 55 adapted to be manually rotated by a member 56 having handles 57, 57 thereon. Sections 53 are similarly operable by links 58, 58 connected to a central member 59 operable by a member 60 having handles 61, 61 thereon. Sections 52 and 53 are guided radially by bolts 62, 62 extending through the fixed drum portion 51 and engaged in slots 63, 63 and 64, 64, respectively, in sections 52 and 53. Links 54 and 58 are adjustable as to length so that the throw of sections 52 and 53 may be such distances beyond the fixed drum portion 51 as are shown in Figure 8, whereby the flipping operation is facilitated.

For positioning the bead and reenforcing strip so that the bead extends about the fixed portion 51 and the projecting portions of the strip to be folded lie on the sections 52 and 53 (Figure 7), bead engaging supports 65, 65 are arranged about drum 50, preferably being supported in pairs on brackets 66, 66 arranged on opposite sides of drum 50 and movable toward and from bead supporting relation to drum 50 by levers 67, 67 pivoted on brackets 68, 68 mounted on table 14 and connected by a link 69 so that the supports 65 are simultaneously operable toward and from the drum.

To the end that the drum 50 may be driven for a flipping operation, a gear 70 is connected thereto and meshes with a gear 71, journaled on shaft 46 and arranged to be clutched thereto by a clutch 72 operable by a lever mechanism 73 normally urged into disengaged position by a spring 74 but adapted to urge the clutch into engagement under the action of a pedal 75 connected thereto by a link 76. For holding drum 50 fixed during application of the bead and strip thereto, a stop 77 is arranged to be swung by a handle 78 into slots as indicated at 79 on the upper face of gear 70.

The flipping mechanism includes a conical roller 80 mounted on a lever 81 pivoted on a bracket 82 and adapted to be actuated to elevate roller 80 against the action of a spring 83 by means of a cam 84 thereon. Roller 80 is thus operable into a position (Figure 9) under the lower portion of strip 12 projecting beyond the outer periphery of the bead to provide a support against which the flipping of the upper portion of the strip 12 may take place.

The flipper element comprises a blade 85 mounted on a lever 86 so as to be operable downwardly on the surfaces of drum sections 52 while drum 50 is rotated to lift the upper portion of strip 12 off the drum, to stitch the said portion of the strip over the hypotenuse of the bead, and finally to stitch the portion thereof projected beyond the bead onto the lower portion of the strip on roller 80 to form the flipper 13. Lever 86 is accordingly pivoted for vertical swinging movement on a swivel 87 mounted on a bracket 88 so that the lever may also be swung toward and from the drum 50. Lever 86 carries a roller 89 arranged to engage cam 84 to elevate roller 80 into flipper forming position as the stitcher blade 85 is swung into operative position. A rest 90 may be mounted on table 14 to support lever 86 in non-operative position.

During operation of the apparatus, it will be understood that one operative is stationed at the strip applying device and another at the strip folding and flipping device. Endless beads 11 and strips 12 are furnished the first operative who positions the beads on rollers 16 against guide rollers 18 and guide 19. One end of the strip 12 is rested on shelf 49 and the other end is placed under bead 10 on guide plate 22 between rails 24 and is pressed against the inner periphery of bead 10. Handle 28$^a$ is then actuated to disengage latch 36 from notch 35 and springs 31 are permitted to urge rollers 26 against the hypotenuse of bead 10. Pedal 48$^b$ is then depressed to drive shaft 46 whereby the bead 10 is circumferentially driven and the strip 12 is progressively drawn over plate 22 and affixed to the inner periphery of the bead, pedal 48$^b$ being released when the bead was made a complete revolution. Guide 19 yields under engagement of strip 12 therewith. Since strips 12 are preferably cut to length so that their ends will be properly spliced by the machine, the first operation is now completed.

The bead 11 with the band of fabric 12 secured to its inner periphery is then taken by the second operative who adjusts supports 65 close to drum 50 and drops the bead 10 thereon so that it will be positioned on the fixed portion 51 of drum 50. Members 56 and 59 are then manually rotated to expand sections 52 and 53, whereby the strip 12 is folded about bead 11 as shown in Figure 8. Stop 77 is then disengaged from gear 70 and pedal 75 is depressed to drive drum 50. Lever 86 is now lifted off rest 90 and swung to a position with blade 85 against the upper part of sections 52, whereupon the blade is operated gradually downwardly between the strip 12 and the drum to turn the strip over the hypotenuse of bead 10 against which it is progressively stitched by continued downward movement of the blade 85. Swinging of the lever 86 over to the drum and its downward movement are effective through roller 89 and cam 84 to elevate roller 80 to a position under the lower marginal portion of strip 12 which has been folded outwardly by sections 53. Accordingly roller 80 provides a support against which continued downward stitching operation of blade 85 is effected to form the flipper 13 on the bead. Upon completion of this stitching operation, pedal 75 is released, lever 86 is placed back on rest 90 and the completed reenforced bead is removed from the machine.

It will be apparent that very rapid procedure and apparatus have been provided for reenforcing beads. They are capable of use to reenforce beads of the larger sizes better than they have heretofore been by hand, a result which, so far as the present inventor is aware, has never before been accomplished.

Modifications of the invention may be resorted to without departing from the spirit thereof or the scope of the appended claims.

What is claimed is:

1. That method of reenforcing endless beads of triangular section, comprising securing in transversely flat form about the inner periphery of the bead a strip of fabric of a width to cover and form a flipper on the bead of a length equal to the circumference of the bead, folding the strip outwardly about the heel and toe of the bead, and stitching one side of the strip down over the hypotenuse of the bead onto the other side of the strip to completely enclose the bead, and stitching the two sides of the strip together in the direction of the hypotenuse of the bead to form the flipper as a conical extension of the hypotenuse surface of the bead.

2. Apparatus for reenforcing endless beads of triangular section, comprising spaced rollers for supporting and circumferentially driving a bead by engagement with its inner periphery, a curved bridge between the rollers on which the bead rides, guides against which one side of the bead may be urged to align the bead during its rotation, pressure rollers opposed to the first-mentioned rollers and operable against the hypotenuse of the bead, and a guide plate directed toward the rollers over which the bead rides and adapted to guide the reenforcing strip against the inner periphery thereof.

3. Apparatus for reenforcing endless beads of triangular section, comprising spaced rollers for supporting and circumferentially driving a bead by engagement with its inner periphery, guides against which one side of the bead may be urged to align the bead during its rotation, pressure rollers opposed to the first-mentioned rollers and operable against the hypotenuse of the bead, and a guide plate directed toward the rollers over which the bead rides and adapted to guide the reenforcing strip against the inner periphery thereof.

HORACE D. STEVENS.